United States Patent
Mckinney et al.

(10) Patent No.: US 10,437,563 B1
(45) Date of Patent: Oct. 8, 2019

(54) ARC³ PHYSICS ENGINE POWERED VISUAL BROWSER WEBSITE DESIGN SYSTEM AND OPERATING SYSTEM

(71) Applicants: Robert Scott Mckinney, Las Vegas, NV (US); Dan Dale Struckman, II, Las Vegas, NV (US)

(72) Inventors: Robert Scott Mckinney, Astoria, OR (US); Dan Struckman Dale Struckman, II, Astoria, OR (US)

( * ) Notice: Subject to any disclaimer, the term of this patent is extended or adjusted under 35 U.S.C. 154(b) by 0 days.

(21) Appl. No.: 15/861,253

(22) Filed: Jan. 3, 2018

(51) Int. Cl.
    *G06F 9/44* (2018.01)
    *G06F 8/30* (2018.01)

(52) U.S. Cl.
    CPC ..................... *G06F 8/31* (2013.01)

(58) Field of Classification Search
    CPC ...... G06F 9/4433; G06F 9/443; G06F 9/4428; G06F 9/465; G06F 17/30607
    USPC ........................................... 717/116
    See application file for complete search history.

(56) References Cited

U.S. PATENT DOCUMENTS

2019/0004792 A1 * 1/2019 Brebner .................... G06F 8/76

* cited by examiner

*Primary Examiner* — Chuck O Kendall

(57) ABSTRACT

Disclosed are the details about our computer system based software, and dedicated server system. The software is composed of a physics engine created with C++, and blueprinting techniques used to create an online web development platform. The physics engine acts as a base system on the computer that greatly enhances the features of a contemporary html, or java website. This system allows us to create more tools within a 3d metaverse, that is simple to use, and solves the 2d traditional website only problem in the internet. The invention has a wide variety of functions that allow 3d objects to be placed inside of the metaverse; customizing the site with a plethora of features including, color, material, images, and shape.

1 Claim, 1 Drawing Sheet

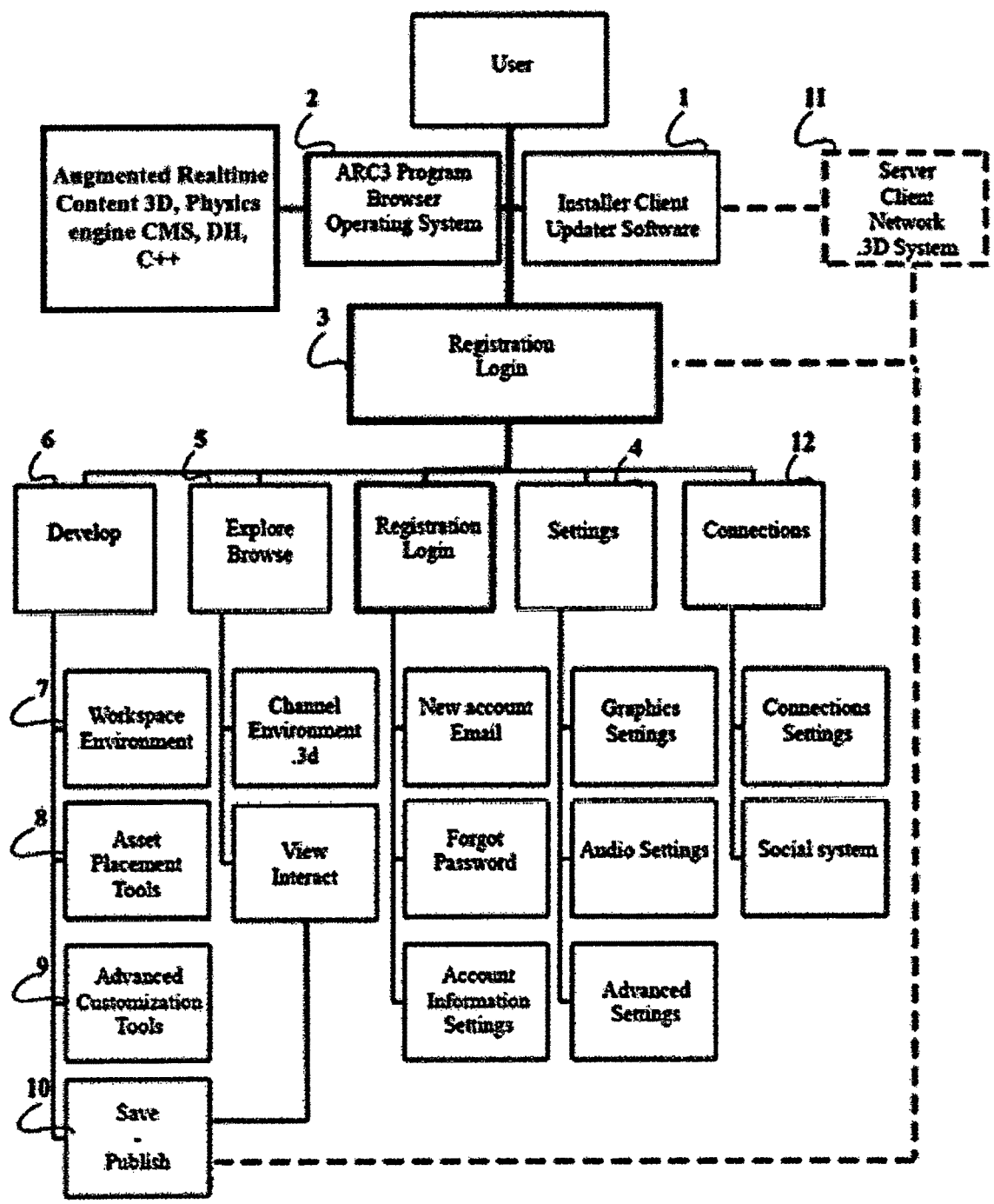

ARC³ PHYSICS ENGINE POWERED VISUAL BROWSER WEBSITE DESIGN SYSTEM AND OPERATING SYSTEM

CROSS REFERENCE TO RELATED APPLICATION this application claims the benefit of U.S. Provisional application Ser. No. 15/861,253 filed on 3 Jan. 2018 entitled "Arc3 Physics engine powered visual browser website design system and operating system."

BACKGROUND OF INVENTION

Field of Invention Specification

ARC3 is a highly innovative software that allows the user to create a 3d (physics engine enabled/C++) metaverse by using state of the art technologies combined into one application. It relates to internet domain registrar "hosting," & engine based web development tools. More specifically, our software allows a user to control multiple functions/specifications through our physics engine based web development software such as, spawning multiple 3d.fbx assets onto one publishable environment, allowing a vast amount of interactive features within the engine itself to be applied as functionalities to these ".fbx" assets. Once the user correctly designs their finished metaverse using the "x-y-z vertex snapping static mesh built in system." Within our program the user can now access multiple functionalities (Color Picker, Placement, C++ interactive settings) to better enhance the 3d physics engine based metaverse/website before going "live" in our "0.3d domain networked connection," (dedicated server system.)

The conventional method of using 2d domain hosting/CMS services "domain registers" based off of HTML, PHP, JavaScript, CSS, DSL or GPL coding languages is that they are significantly limited compared to a C++ driven physics based engine that is developed into a "content management system, domain host platform," attached to a highly optimized dedicated network system (DH/Domain Hosting/Registrar, and CMS/Content Management System.) This is extremely problematic to have such limited functionality in the 21st century of internet technology, telecommunications, and entertainment software/CMS/DH. There's a high demand for a more innovative/enhanced online system that can provide more robust features, a higher quality of visual 3d graphics, extra dimensional working space "environments" vastly improving todays conventional methods of 2d based CMS, & DH.

ARC3 "Augmented Realtime Content 3D" (Physics engine powered visual browser, website design system, and operating system.) CMS/DH software framework coded in C++ based from a modified development integration suite, (rendering, physics, scripting, sound, animation, AI, streaming, networking, memory management, localization support, threading, scene graph) engine technologies. This robust suite of features allows us to greatly improve the common CMS/DH systems by coding these integrated suite features into a well developed multifaceted software system.

The fact that most modern computers have the ability to render extremely complex environments with sophisticated mathematical backend coded algorithms, thus being able to support a plethora of multifaceted rendering features should be a sign that DH/CMS should also perform likewise. Through our software system it is completely feasible to provide these features within a metaverse, DH, CMS giving extended customization tools to the public greatly enhancing what is commonly available. ARC3 can give the user a 3d environment/metaverse/website with amazing features, graphics, and an easy to use "user interface(s)" all within our provided software as described above in detail. Common domain hosting systems, and content management systems are currently lacking 3d features. ARC3 will provide these features and systems all within our software.

The website/metaverse should be visually enticing and overtly simple to use. Allow user blog's, forums, registration with online ID, email Password, or username with simple web registration methods. Admin Forum Board with latest updates on development and packages. Private installer for our application that can remotely update our software. A simple UI that makes it easy to upload photo's, chat system with friends, groups, store, buying models/assets, templates, and themes. The effect "project: visual interface UI/web browsing+engine=3d domain registrar & host=new 3d internet with marketing abilities, & social features. (.com, >0.3d) website development tools/SDK/CDK/domain registration/website development/publishing of 0.3d website/online development/Server Connections like MMO technologies/Multiple users. All of these features within one software that is easy to use, visually advanced compared to any other CMS/DH is the effect and solution that is ARC3.

BRIEF DESCRIPTION OF THE DRAWING

The characteristics as described in the drawing in a flow chart manner show how it functions from the server into the software's features, and capabilities. It displays the common use of downloading, installing, registering an account, logging in with an account, settings, browsing, metaverse development features/functions, and publication onto a 0.3d domain host internet network.

DETAILED DESCRIPTION OF THE INVENTION

Referring directly to the flow chart drawing provided: 1, The user downloads our installer client, that will install the ARC3 application and suite onto the computer in all of the proper locations, and folders as well as keeping it updated via the server. 2-3, Through the ARC3 Software they can register and login into their account using an email along with other account information. 4, From within ARC3 they can access a settings menu, in which all graphical, audio, and advanced software settings can be adjusted for optimization. 5. The browser, or explore option allows the user to access other 0.3d domains or previously saved projects. 6-10, The develop option gives the user access to multiple features, like a workstation for creating a project, including: asset placement tools, advanced customization tools, and the option to save or publish the metaverse/website online. 11, The Server network system is a compiled database that allows the connection of different 3d domains, and installation of software. 12, The Connections option is the saved history or friends that have been accepted or saved in a contact list which allows easier access.

We claim:
1. A physics engine modified content management system, and domain host software better described as augmented realtime content 3d, or physics engine powered visual browser website design system, and operating system comprising of:

a game engine that is C++ coded using blueprint methods to act as an interactive content environment with website capabilities better known as a metaverse;

said software is further comprising of a full set of highly customizable tools, and features including the ability to bring in 3d asset's into an existing or prefabricated 3d environment, using a colour picker to change the textures, and values into a range of variables and colours;

the features include but aren't limited to the ability to save the finished 3d metaverse/website on a personal or business computer or other platforms to be published on the internet at a later time, by using a dedicated server to host the personal or business metaverse as a 0.3d domain for others users to interact with;

said network system is a content management system, and domain hosting software connected to a dedicated server system;

said features and tools are like nothing before that has been accomplished using a gaming engine to function as a highly sophisticated content management system, and domain hosting software system creating a 0.3d domain network, or 3d enhanced internet platform.

* * * * *